(12) United States Patent
Haugaard et al.

(10) Patent No.: US 7,207,690 B2
(45) Date of Patent: Apr. 24, 2007

(54) LINEAR FLUORESCENT HIGH-BAY

(75) Inventors: Eric J. Haugaard, Kenosha, WI (US); Craig Raleigh, Saukville, WI (US); Alan J. Ruud, Racine, WI (US); Dallas I. Buchanan, Evanston, IL (US)

(73) Assignee: Ruud Lighting, Inc., Racine, WI (US)

( * ) Notice: Subject to any disclaimer, the term of this patent is extended or adjusted under 35 U.S.C. 154(b) by 0 days.

(21) Appl. No.: 11/236,906

(22) Filed: Sep. 28, 2005

(65) Prior Publication Data

US 2006/0023445 A1   Feb. 2, 2006

Related U.S. Application Data

(62) Division of application No. 10/679,228, filed on Oct. 2, 2003.

(51) Int. Cl.
 *F21S 4/00* (2006.01)
(52) U.S. Cl. ............... 362/225; 362/222; 362/243; 362/346
(58) Field of Classification Search ............ 362/217, 362/220, 222, 225, 240, 241, 242, 243, 247, 362/297, 346, 223, 224
See application file for complete search history.

(56) References Cited

U.S. PATENT DOCUMENTS

| 1,451,893 A | 4/1923 | Ryan |
| 1,740,229 A | 12/1929 | Dorey |
| 2,418,195 A * | 4/1947 | Rolph ..................... 362/217 |
| 2,888,113 A | 5/1959 | Schwartz et al. |
| 4,263,639 A | 4/1981 | Schacht |
| 4,338,653 A | 7/1982 | Marrero |
| 4,344,111 A | 8/1982 | Ruud et al. |
| 4,562,517 A | 12/1985 | Pankin |
| 4,599,684 A | 7/1986 | Lee |
| 4,667,275 A | 5/1987 | Herst et al. |
| 4,747,027 A * | 5/1988 | Rieger ..................... 362/217 |
| 4,939,627 A | 7/1990 | Herst et al. |
| 5,051,878 A | 9/1991 | Ngai |
| 5,062,030 A * | 10/1991 | Figueroa ................... 362/346 |
| 5,111,370 A | 5/1992 | Clark |
| 5,160,193 A | 11/1992 | Fabbri et al. |
| 5,192,129 A | 3/1993 | Figueroa |
| 5,252,894 A | 10/1993 | Bank et al. |

(Continued)

Primary Examiner—Renee Luebke
Assistant Examiner—Gunyoung T. Lee
(74) Attorney, Agent, or Firm—Jansson Shupe & Munger Ltd.

(57) ABSTRACT

A method, for implementing lighting by utilizing a lighting fixture having a plurality of laterally-spaced light source locations and corresponding lateral reflector positions, may include selectively installing a reflector of a first type or a second type in respective ones of the plurality of lateral reflector positions, the first type reflector having greater uplighting capacity compared to the second type reflector, whereby the selectively installing determines a proportion of uplight versus downlight. For a plurality of tube positions disposed in a plane, a method may include vertically positioning a reflector assembly with respect to the plane. Individual reflector panels may be replaced by flexing the panel. A method may include providing a sensor switch operative to detect an occupant and connect an electrical path when the occupant is detected, and providing a selector for selecting ones of the ballasts to be connected to the electrical path by the sensor switch.

12 Claims, 12 Drawing Sheets

U.S. PATENT DOCUMENTS

| | | | |
|---|---|---|---|
| 5,339,382 A | 8/1994 | Whitehead | |
| 5,526,244 A | 6/1996 | Bishop | |
| 5,570,947 A | 11/1996 | Felland | |
| 5,615,943 A | 4/1997 | Coldren | |
| 5,842,767 A | 12/1998 | Rizkin et al. | |
| 5,884,993 A * | 3/1999 | Conn | 362/217 |
| 5,946,209 A | 8/1999 | Eckel et al. | |
| 5,962,989 A | 10/1999 | Baker | |
| 6,000,810 A | 12/1999 | Nolan et al. | |
| 6,092,913 A | 7/2000 | Edwards, Jr. | |
| 6,102,550 A * | 8/2000 | Edwards, Jr. | 362/221 |
| 6,161,939 A * | 12/2000 | Bansbach | 362/223 |
| 6,170,962 B1 | 1/2001 | Wordin | |
| 6,190,023 B1 | 2/2001 | Leadford et al. | |
| 6,250,772 B1 | 6/2001 | Entrop et al. | |
| 6,250,780 B1 | 6/2001 | Minissi et al. | |
| 6,310,440 B1 | 10/2001 | Lansing et al. | |
| 6,382,817 B1 * | 5/2002 | Chelf | 362/322 |
| 6,419,375 B1 | 7/2002 | Leadford et al. | |
| 6,428,183 B1 * | 8/2002 | McAlpin | 362/225 |
| 6,478,454 B1 | 11/2002 | Jaffari et al. | |
| 6,558,023 B2 | 5/2003 | Casciani et al. | |
| 6,561,678 B2 * | 5/2003 | Loughrey | 362/282 |
| 6,575,594 B1 | 6/2003 | Jafari | |
| 6,583,573 B2 | 6/2003 | Bierman | |
| 6,585,396 B1 | 7/2003 | Verfuerth | |
| 6,758,580 B1 | 7/2004 | Verfuerth | |
| 6,908,212 B2 * | 6/2005 | Schultz | 362/217 |
| 6,942,364 B1 * | 9/2005 | Wegner et al. | 362/281 |
| 2003/0076677 A1 | 4/2003 | Mohacsi et al. | |
| 2003/0223231 A1 * | 12/2003 | McCarthy et al. | 362/219 |
| 2006/0164841 A1 | 7/2006 | Haugaard et al. | |

\* cited by examiner ized to provide the necessary level of illumination. In

LINEAR FLUORESCENT HIGH-BAY

RELATED APPLICATIONS

The present application is a divisional of patent application Ser. No. 10/679,228, filed Oct. 2, 2003.

BACKGROUND

1. Field of the Invention

The present invention relates to lighting systems and, more particularly, to reflector type fixtures optimized for use in an industrial facility.

2. Background of the Invention

Fluorescent lighting fixtures are used in various applications such as being recessed in hung ceilings or being used as stand-alone units hung, for example, from the rafters of an industrial or commercial building. Traditionally, fluorescent lighting fixtures have been used in such recessed applications because they generate much less heat than other types of lighting units, e.g., high intensity discharge, and because they may have a physical package with a short height and/or a small width (depending on the number of tubes in the fixture).

Many areas in stores, warehouses, and commercial buildings are illuminated by various free-standing types of lighting fixtures that may be suspended from the ceiling, such lighting fixtures typically containing lamps such as mercury vapor, metal halide, or sodium types. Industrial or commercial lighting may be classified as being high bay or low bay, depending on a nominal height of the fixture above the floor of the room being illuminated. In most lighting applications it is desirable to direct the light downward, for example, to illuminate aisles in a store or warehouse, as necessary in a building having a high bay. As a low-power, low-cost alternative to expensive high intensity discharge (HID) type lamps that may generate excessive heat, require expensive and heavy ballasts, or that may be of a design not readily adaptable to different lighting applications, many commercial lighting installations utilize fluorescent lamp fixtures. Such fluorescent fixtures may have a lower wattage requirement and cost. Other reasons may dictate choosing fluorescent fixtures, for example, lower temperatures, smaller and lighter ballasts, power distribution requirements, lower intensity, etc. Although it may be advantageous to provide fluorescent lighting in these applications, it may be difficult to provide the necessary efficiency and directivity. A higher efficiency is desirable, for example, to reduce the number of luminaries to produce the necessary level of illumination. In addition, traditional luminaries may be inadequate, for example, in buildings such as warehouses, which have high ceilings necessary to accommodate high stacking and shelving of items.

Fluorescent lighting systems may be implemented as so-called "compact" fluorescent devices, as well as conventional "linear" fluorescent fixtures. The newer compact devices typically utilize smaller diameter, shorter fluorescent tubes that may be formed in a "U". For lighting fixtures of both the compact and linear fluorescent type it may be difficult to adapt to various lighting requirements and applications in a high bay. Traditional high bay lighting may not be optimized because, although it is important that light be efficiently directed downwardly from a high location onto an illuminated surface, many high bay lighting situations may include areas that require less light some or all of the time.

OBJECTS OF THE INVENTION

It is an object of the invention to provide an improved linear type fluorescent lighting fixture that overcomes some of the problems and shortcomings of the prior art, including those referred to above.

Another object of the invention is to provide apparatus and method for selectively configuring a fluorescent lighting fixture for customizing a proportion of uplight versus downlight emitted by the fixture.

Another object of the invention is to provide a modular linear fluorescent lighting fixture and method where individual reflector panels of the fixture may be replaced without removing the lighting fixture from its installed location and without disassembling the lighting fixture.

Still another object of the invention is to provide a fluorescent lighting fixture that is configurable between a narrow lighting distribution pattern and a wider light distribution pattern.

Yet another object of the invention is to provide apparatus and method for externally configuring a step dimming of a multiple-lamp fluorescent lighting fixture.

Another object of the invention is to provide a fluorescent lighting fixture having a low profile.

A further object of the invention is to provide a system for fluorescent lighting and method for implementing various lighting control in a master/slave configuration.

How these and other objects are accomplished will become apparent from the following descriptions and the drawings.

SUMMARY OF THE INVENTION

According to one aspect of the present invention, a method is provided for implementing lighting by utilizing a lighting fixture having a plurality of lateral reflector positions, the method including selectively installing a reflector of a first type or a second type in respective ones of the plurality of lateral reflector positions, where the first type reflector has a greater uplighting capacity compared to the second type reflector, whereby the selectively installing determines a proportion of uplight versus downlight.

In another aspect of the invention, a method for implementing lighting includes providing a lighting fixture having a plurality of lateral reflector positions, and providing a plurality of reflectors of a first type and a second type, the reflectors for being selectively installed in respective ones of the plurality of lateral reflector positions, where the first type reflector has a greater uplighting capacity compared to the second type reflector, and wherein selective installation of the reflectors determines a proportion of uplight versus downlight.

According to another aspect of the invention, a method for achieving a desired proportion of uplight versus downlight includes providing a program product operative for selecting between a first type reflector and a second type reflector for installation at a given one of a plurality of reflector positions, where the first type reflector has a greater uplighting capacity compared to the second type reflector.

In another aspect of the invention, an illuminating system includes a fluorescent lighting fixture having a plurality of reflector positions, and a plurality of reflectors of a first type or a second type, where the first type reflector has a greater uplighting capacity compared to the second type reflector, and each of the plurality of reflector positions is adapted to install one of the first type reflector and the second type reflector therein.

In another aspect of the invention, a method for implementing lighting includes providing a fluorescent lighting fixture having a plurality of tube positions disposed in a plane, and providing a reflector assembly vertically positionable with respect to the plane.

In another aspect of the invention, a method for implementing lighting includes providing a fluorescent lighting fixture having a plurality of tube positions disposed in a plane, and vertically positioning a reflector assembly with respect to the plane, at a selected one of a plurality of vertical reflector positions.

In another aspect of the present invention, a linear fluorescent lighting fixture includes a plurality of tube positions disposed in a plane, and a vertically-positionable reflector assembly, the reflector assembly having a plurality of reflectors corresponding to the plurality of tube positions and structured to be vertically positionable with respect to the plane.

In another aspect of the invention, a method for implementing lighting with a linear fluorescent lighting fixture having a plurality of ballasts includes providing a sensor switch operative to detect an occupant within a view and to connect an electrical path when the occupant is detected, and providing a selector for selecting ones of the ballasts to be connected to the electrical path by the sensor switch.

In another aspect of the invention, a linear fluorescent lighting system includes a plurality of ballasts, a sensor switch operative to detect an occupant within a view and to connect an electrical path when the occupant is detected, and a selector for selecting ones of the ballasts to be connected to the electrical path by the sensor switch.

In another aspect of the invention, a linear fluorescent lighting fixture includes a plurality of fluorescent tube locations, a plurality of pairs of tube sockets, one pair of sockets being disposed at each of the plurality of fluorescent tube locations, a pair of socket mounting plates for holding the plurality of tube sockets, a plurality of laterally-flexible reflector panels, one of the reflector panels being disposed at each of the plurality of fluorescent tube locations, and a pair of endcaps each having a plurality of horizontal slots for receiving edges of ones of the reflector panels, where at least one of the reflector panels is removable and insertable with respect to ones of the horizontal slots by laterally flexing the reflector panel.

As a result of implementing some of the various aspects of the invention, different areas in stores, warehouses, and commercial buildings may be illuminated by use of lighting fixtures that may be easily adapted for changing a proportion of uplighting versus downlighting, replacing reflector panels, altering a directivity of lighting, providing selectable step dimming, utilizing motion or similar detection switching, and others. A switching of individual ballasts provides an energy savings and a lower temperature of operation. A high efficiency is provided by utilizing optimized reflector designs. A low profile design allows use where available vertical height is limited.

Additional advantages and a more complete understanding of the present invention may be derived by referring to the detailed description of preferred embodiments and claims when considered in connection with the figures, wherein like reference numbers refer to similar items throughout the figures.

DETAILED DESCRIPTION OF PREFERRED EMBODIMENTS

Figure 1:
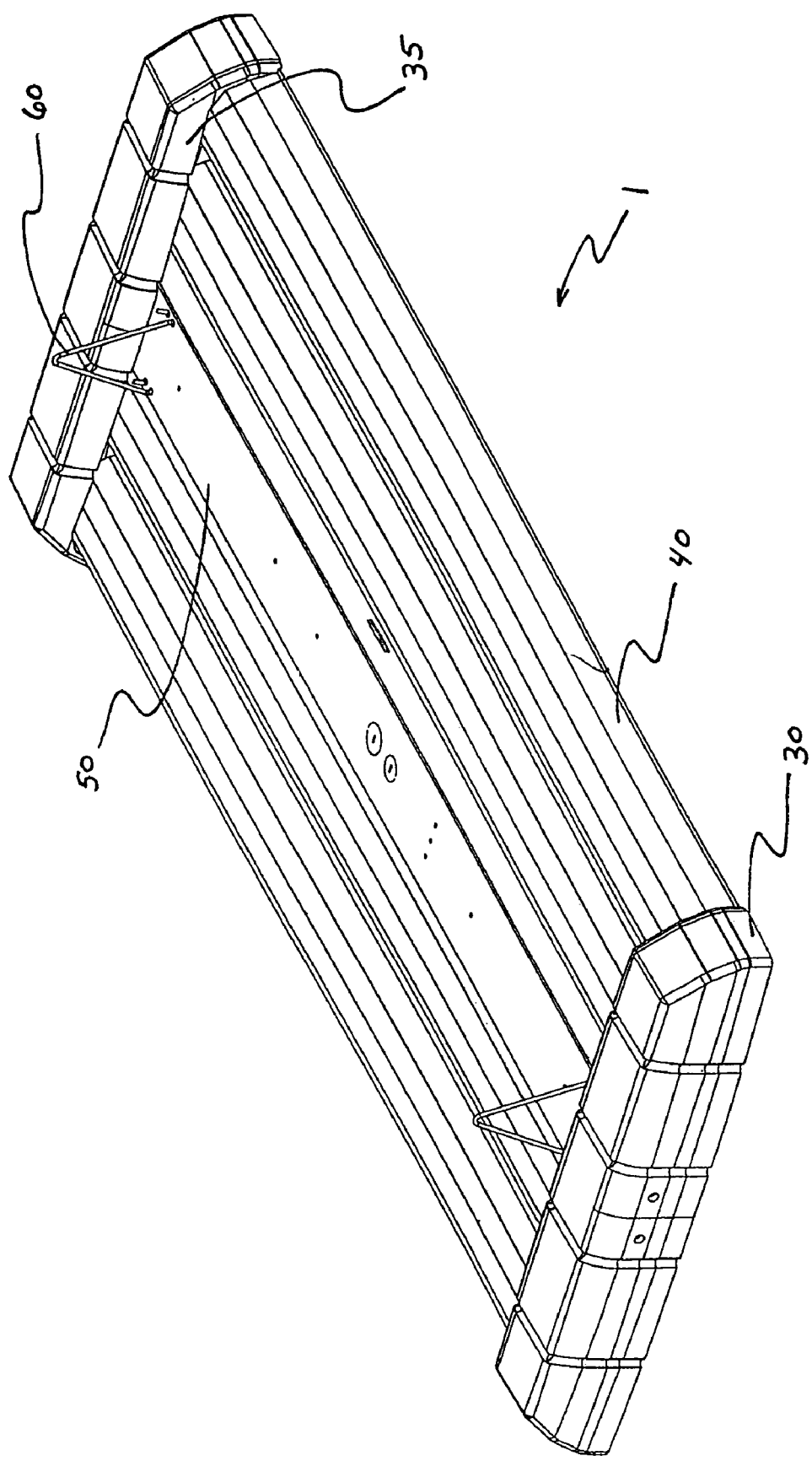
FIG. 1 is a view showing an upper portion of a lighting fixture according to an exemplary embodiment of the present invention.
Figure 2:
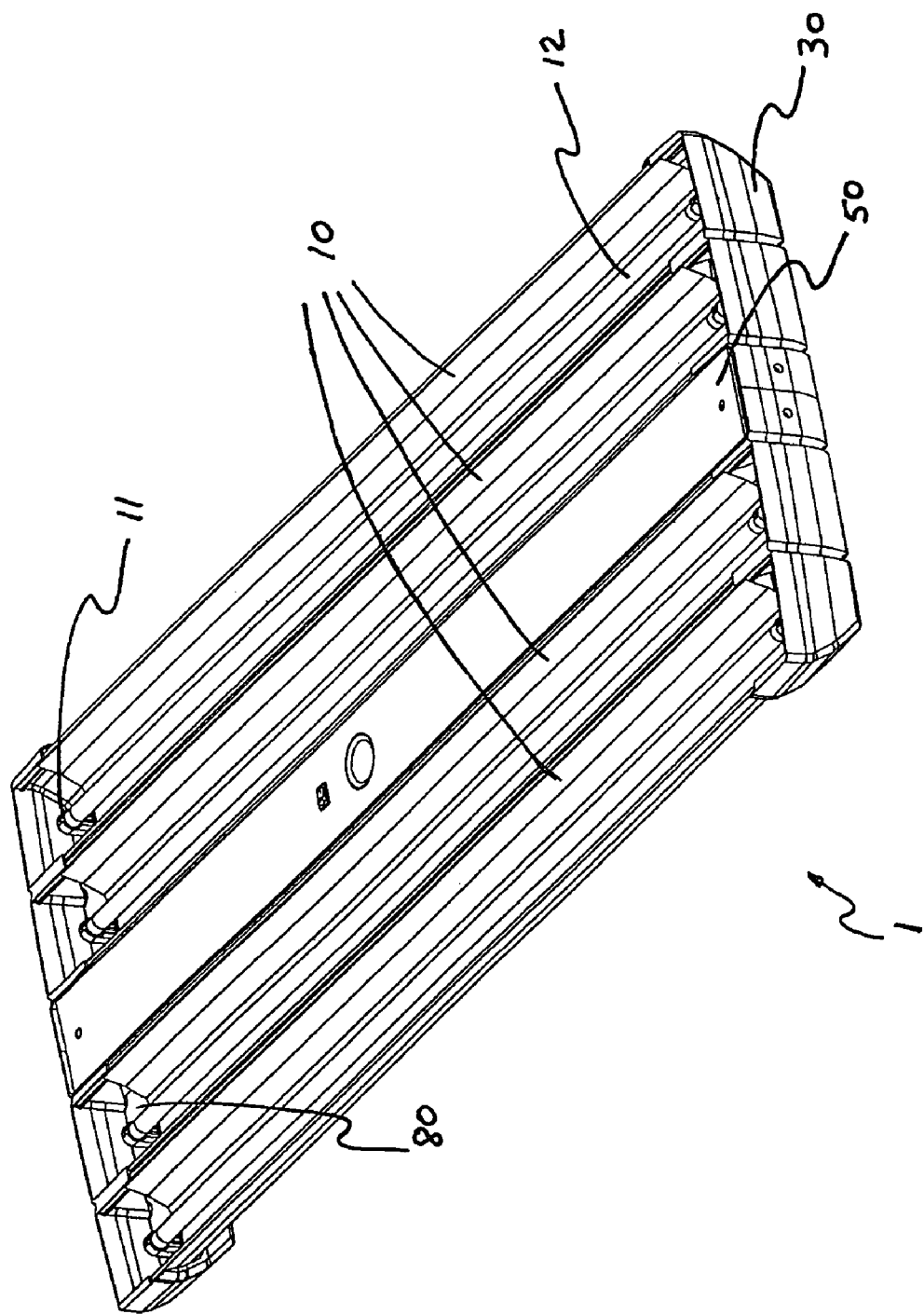
FIG. 2 is a view showing a bottom portion of the lighting fixture of FIG. 1

FIGS. 1–2 show a linear fluorescent high-bay fixture 1 according to an embodiment of the present invention. Individual cells 10 are formed to each include a linear fluorescent tube 12 and a pair of tube sockets 11. The fluorescent tube 12 is typically a tubular discharge vessel made of glass, into the end caps of which thermionic cathodes are melted. The tube 12 is typically formed by being evacuated and filled with argon and mercury. At both end caps of the tube 12, the thermionic cathodes are routed to the outside as two terminals each. Therefore, the tube 12 generally has two electrical terminals (not shown) at each lengthwise end, and the pairs of sockets 11 are each located so that a corresponding tube 12 may be inserted into a respective pair of sockets 11 by moving the tube 12 into position where the terminals slide into a lateral slot (not shown), whereupon the tube 12 is rotated until the terminals are engaged with the socket 11 in a known manner. The tube 12 typically has a standard length in increments of one foot (e.g., four feet) and has a standard diameter in increments of one-eighth inch (e.g., T5=5/8 inch diameter; T8=one inch diameter). Tubes may have a variety of properties such as, for example, those pertaining to their ability to withstand being turned on and off, their light output, their efficiency, etc. A suitable 54 watt T5 type tube is the model 90209 available from General Electric Co. A suitable socket is a model 109541.01 available from Vassloh. Each cell 10 has at least one reflector panel 40 located so that a respective tube 12 is positioned in a concave portion with respect to the reflector 40. In a fixture 1, 100, a gap may be provided (e.g., ~1/4 inch) between bottom-most portions of adjacent ones of the reflector panels 40, 140, and/or between bottom-most portions of adjacent ones of the reflector panels 40, 140 and the ballast channel assembly 50. By comparison, conventional multi-lamp fluorescent fixtures typically utilize a structure where adjacent reflectors touch. Although such a conventional structure may provide a narrower lighting fixture, this does not consider other parameters that are important to proper operation of a lighting fixture. The present inventors have determined that by providing the above-described gaps, a convection type cooling of the fixture may be provided. It is important that components of a lighting fixture such as the tubes 12 maintain a desired ambient temperature for long life and proper operation. For example, an optimum ambient temperature for a fluorescent lamp may be about 25 degrees C., where a lower or higher ambient temperature causes a less than optimum performance of the lamp. In addition, such gaps allow dust and other foreign materials to pass through the fixture rather than attaching and causing a reduced cooling of the fixture or unhealthy environment. Further, as discussed further below, the gaps may be used for reaching a lateral side of a reflector panel 40, 140 for laterally urging the reflector panel 40, 140 in order to disengage the flange portions 41, 141 of the reflector 40, 140 from the corresponding slot portions of the endcaps 30, for removing and replacing reflector panels 40, 140 without a need to disassemble the fixture 1, 100.

The tube sockets 11 at each end of the light assembly 1 are mounted on a respective socket mounting plate 80 that extends in a widthwise direction. The socket mounting plates 80 are attached to respective lengthwise ends of a ballast channel assembly 50 that has a lengthwise dimension located along the center longitudinal axis of the lighting fixture 1. The ballast channel assembly 50 receives electrical conductors such as wires (not shown) from the sockets 11 for connection to wires or terminals of one or more ballasts 55 mounted to an interior wall of the ballast channel assembly 50. The ballast 55 receives an AC line voltage. For example, in the U.S., ballast line voltage options include 120, 208, 240, 277 or 480 volts, whereas in Canada, ballast options include 120, 277 and 347 volts. The ballast 55 preferably has a circuit arrangement for the operation of a number (e.g., two) of fluorescent tubes, the circuit including an alternating current supply, with a reactance coil and a glow discharge igniter, simply referred to as starter, being required for striking the gas discharge. The reactance coil and the starter may be replaced by using an electronic ballast (elektronisches Vorschaltgerat) ("EVG") for an energy-saving operation that has a high efficiency. Many different types of ballast may be substituted depending on, for example, weight, heating, cost considerations, type of tubes, etc. Electrical connections from the ballast 55 to the individual sockets XX may be accomplished by using well-known twist-on wire connectors (not shown) or similar connection devices, or by wires that run directly from individual sockets 11 to push-type terminals located in a terminal strip portion of the ballast 55. Suitable twist-on wire connectors, for example, are a model 773-104 available from Wago, and a suitable ballast for powering a pair of T5 tubes is a model ICN-2S54-90C available from Advance. The wires from the ballast 55 may alternatively be provided as a harness type assembly having a connector that plugs into a corresponding connector on the ballast 55 itself. Such a harness may also be used when connecting to a ballast having wires instead of terminals, so that the ballast may be replaced without a need to rewire the lighting fixture 1.

The lighting fixture 1 includes a hanger assembly 60 for suspending the lighting fixture 1 from a ceiling, rafters, etc. The hanger assembly 60 may include metal "V" shaped rods that fit into holes or recesses formed in the ballast channel assembly 50 or in the endcaps 30. A wire or chain may then be passed through or attached to the V-shaped rod. Alternatively, a rigid metal member may be securely attached to the ballast channel assembly in order to provide electrical grounding and/or a more secure structure. The endcaps 30 may be provided with inner panels 35 that may be used to cover any exposed portion of the top or upper side portion of the fixture 1. An additional top cover plate (not shown) may be provided to cover the top of the lighting fixture 1 in order to provide a nicer appearance.

Figure 3:
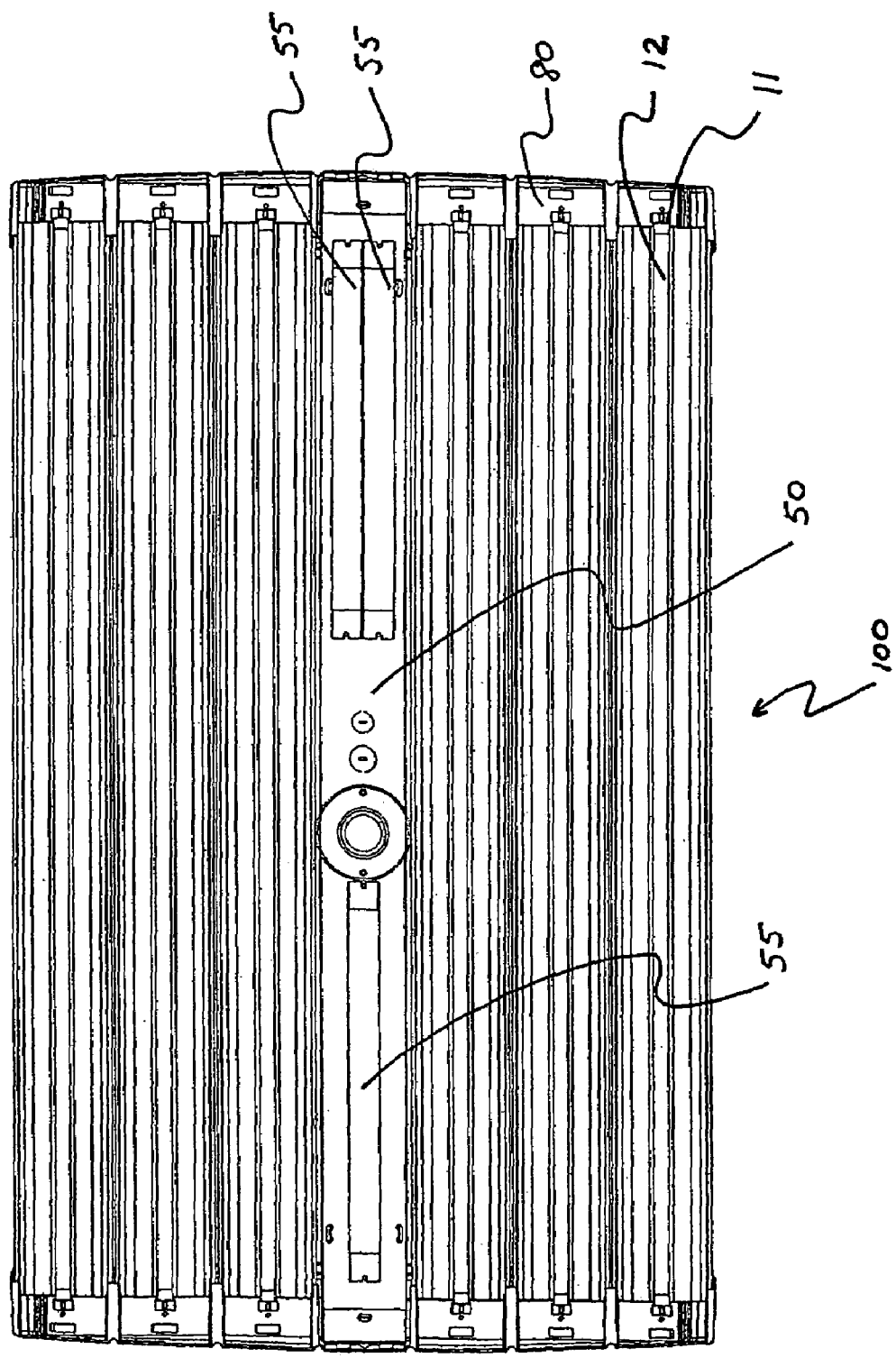
FIG. 3 is a bottom view of a six-tube fixture showing a location of various components including those of a ballast channel assembly, according to an exemplary embodiment of the present invention.

FIG. 3 shows a positioning of three individual two-lamp ballasts 55 in the ballast channel assembly 50, for an exemplary embodiment of a lighting fixture 100 having six tubes 12. As can be seen, the narrow profile of the ballasts 55 allows for placing the ballasts 55 adjacent one another while maintaining a ballast channel 50 having a small width. It is noted that the ballast channel 50 being provided in a same plane as the cells 10 allows either lighting fixture 1 or 100 to have a short vertical height compared with conventional fixtures that position a ballast atop a tube position.

Figure 4:
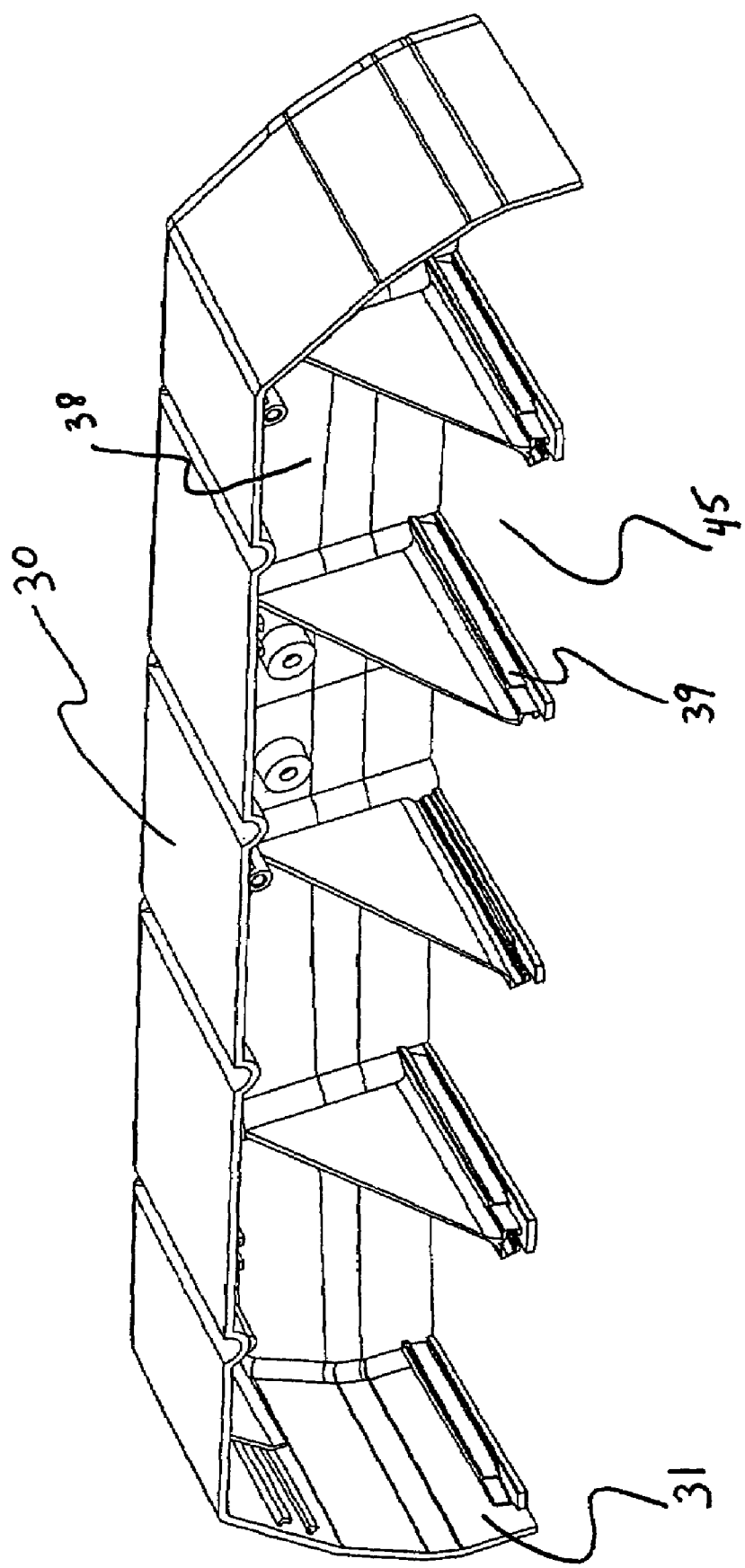
FIG. 4 is a inner view of an endcap for a lighting fixture according to an exemplary embodiment of the present invention.
Figure 5:
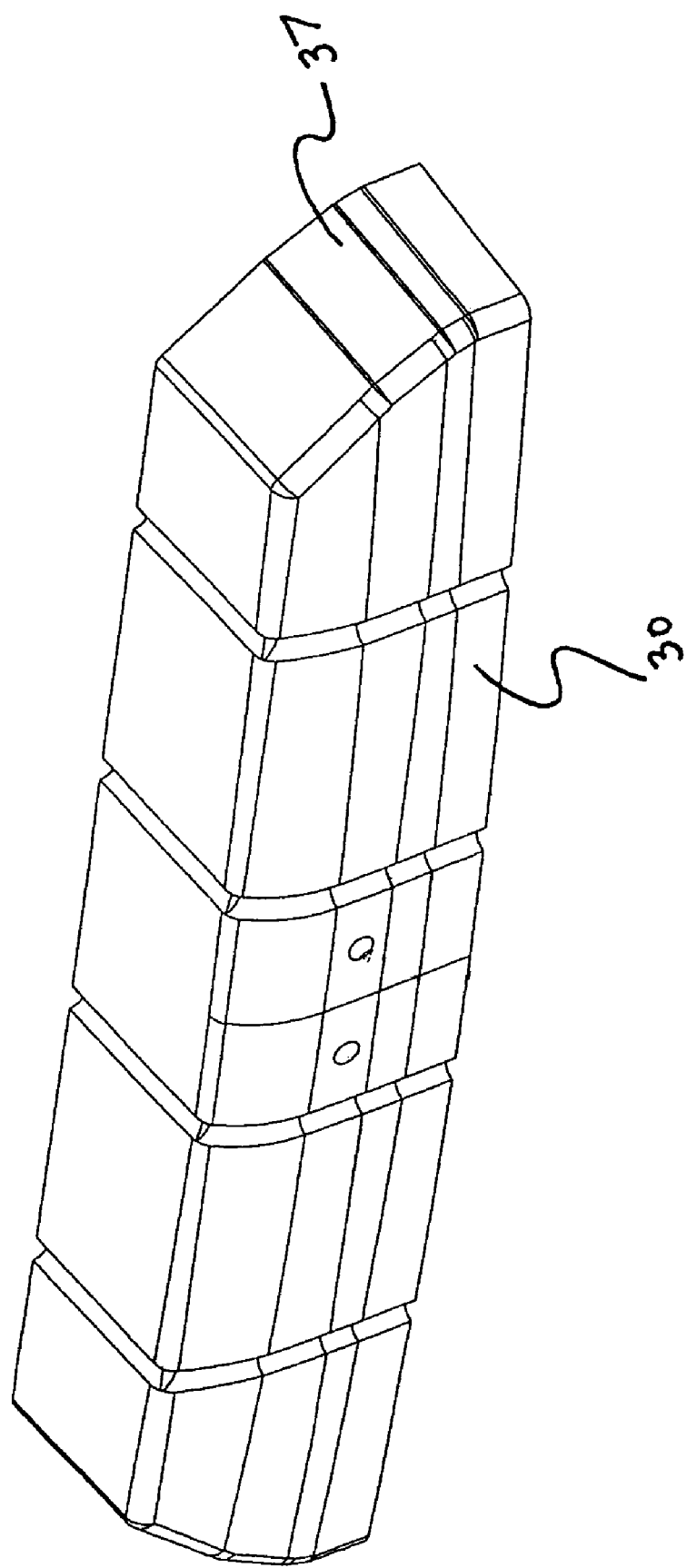
FIG. 5 is an outer view of the endcap of FIG. 4.

The ballast channel 50 and socket mounting plates 80 are preferably formed of suitable metal(s) or similar lightweight conductive materials. An endcap 30 is located at each end of the lighting fixture and is connected to the ballast channel assembly 50 and/or to the corresponding socket mounting plate 80. Referring to FIGS. 4–8, the end caps 30 may be formed of a plastic, lightweight metal, or similar material, and having slots 32, 33 formed in ribs 36 located on an inner surface 31 of the endcap 30, the slots 32, 33 for receiving flanged end portions 41 of reflector panels 40. The end cap 30 is preferably removably attached to the ballast channel assembly 50 and/or the socket mounting plate 80 so that the endcaps 30 and reflector panels 40 may be removed for cleaning, replacement, or interchanging. As shown in FIG. 5, the endcap 30 has an outer portion 37 that prevents any of the inner parts of the fixture 1 from being exposed. The outer portion 37 has a lateral endmost portion that may be curved or faceted in order to provide an attractive appearance.

The reflector panel 40 may be formed having a flexible structure that maintains a preformed shape. The flanged end portions 41 are placed in corresponding notches 32, 33 formed in the end caps 30 so that the reflector panels 40 'float' without a need for attachment members to hold the reflector panel 40 to the lighting fixture 1. Where required, a grounding strap or similar structure for grounding a metal reflector panel 40 may be provided. Preferably, the grounding strap may be easily connected or disconnected to a convenient grounding location such as, for example, to a lug or terminal located at a convenient position along a metal surface of the fixture 1. It is further preferred that the grounding strap and terminal location be accessible yet hidden from view when the fixture is installed for operation. The aforementioned preformed shape may include facets and/or prism-shaped sections, discussed below, that help maintain the shape while also being formed to direct the light in a predetermined manner.

Figure 6:
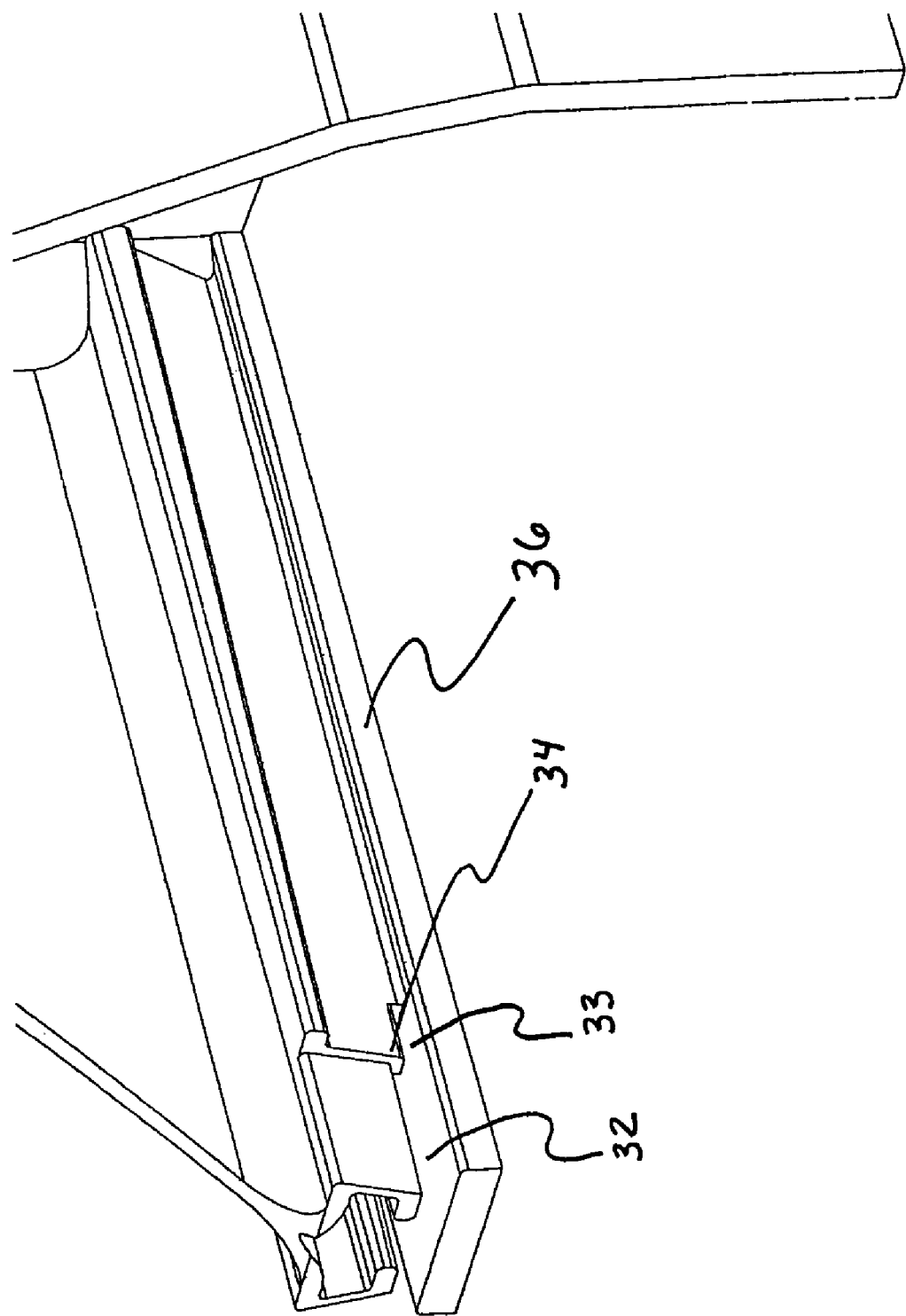
FIG. 6 is a detailed view of a reflector mounting portion of the endcap of FIG. 4.

As shown in FIG. 6, the ribs 36 include at each reflector attachment location a narrow horizontal slot 33 and a wider horizontal slot 32, where a projection member 34 constitutes a lateral end stop for the wider horizontal slot 32 and constitutes an upper surface for the narrow horizontal slot 33. The horizontal slots 32, 33 provide for interchangeability of reflector panels 40, 140 into the same endcap 30.

Figure 7:
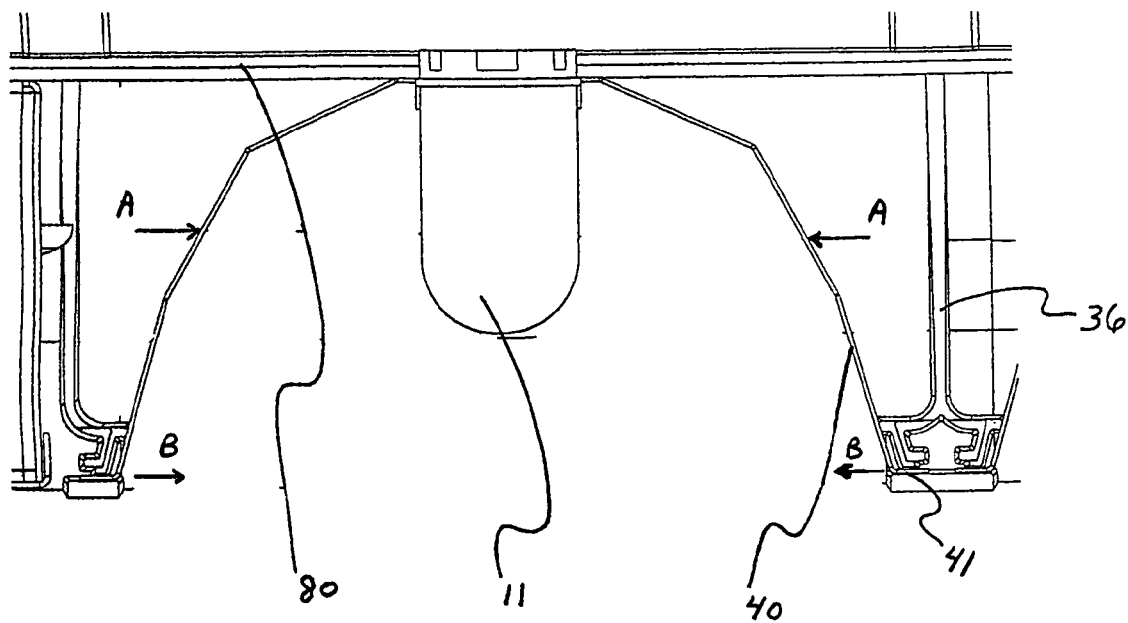
FIG. 7 is an end view of a cell of a lighting fixture that contains a faceted first type reflector, according to an exemplary embodiment of the present invention.
Figure 8:
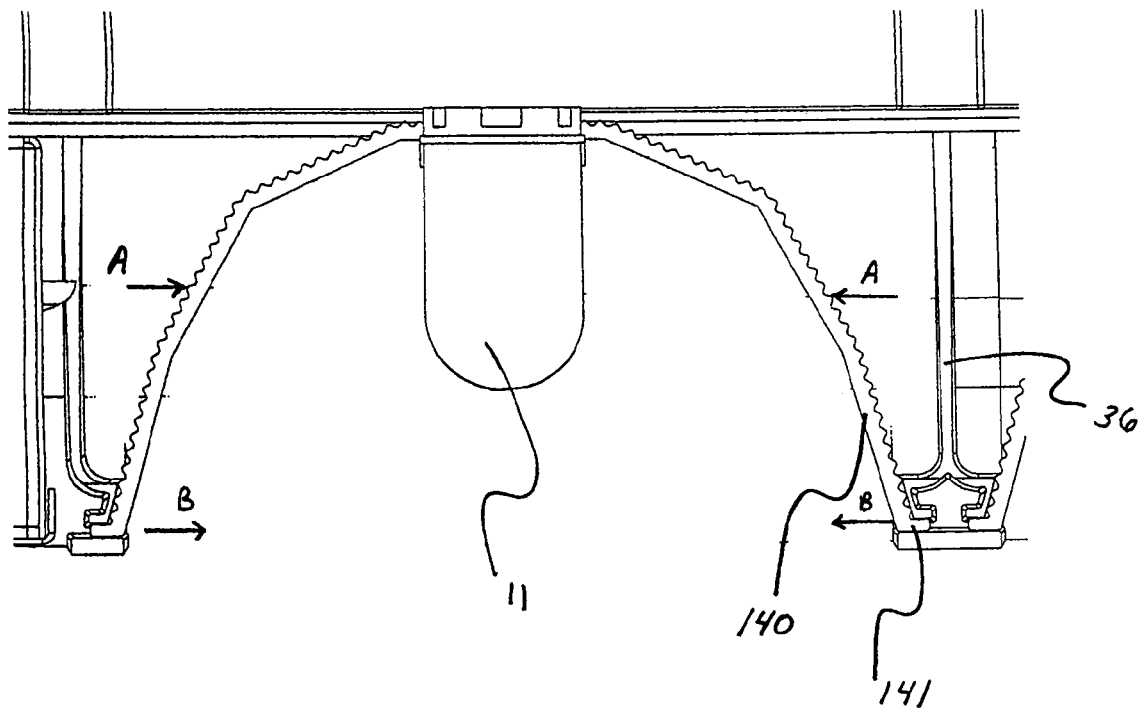
FIG. 8 is an end view of a cell of a lighting fixture that contains a faceted prismatic second type reflector, according to an exemplary embodiment of the present invention.

As shown in FIG. 7, the reflector 40 may be formed as a multi-faceted structure of a thin gauge (e.g., 0.020 inch) metal such as aluminum or similar metal, where the thin flanged end portions 41 of the reflector 40 fit into the narrow horizontal slots 33 of the endcaps 30. As shown in FIG. 4, a lengthwise end space 45 is formed between an inner wall 38 of the endcap 30 and a reflector stop location 39 where the lengthwise ends of the reflectors 40 are located when the reflectors 40 are installed in the endcap 30. This space 45 allows a user to reach inside the lighting fixture and push the reflector panel 40 at outer sides thereof as shown by the arrows marked as "A" in FIG. 7. By such pushing of the side(s) of the reflector 40, the flanged end portions 41 of the reflector 40 are disengaged from the slots 33 in a direction "B," allowing the user to remove the reflector panel 40 from the lighting fixture 1. In a same manner, as shown in FIG. 8, the reflector 140 formed of a thicker acrylic material may be removed from ribs 36 of the endcaps 30 by pushing the reflector 140 in a direction "A" which causes the flanged end portions 141 of the reflector 140 to become disengaged from the slots 33 in a direction "B." It can be seen that the metal reflector 40 has thinner longer flanges 41 compared to those corresponding flanges 141 of reflector 140. Parameters such as a retention length of the flanges 41, 141 and a stiffness of the reflector 40, 140 may be varied depending upon a particular fixture design.

The reflector panels 40, 140 may be formed of various materials depending on whether it is necessary that they be conductive, opaque, translucent, transparent, of a given weight or structural strength, within a cost budget, fire retardant, attractive, reflective or non-reflective, smooth or coarse, or with any combination of properties or features. In a preferred embodiment, various types of reflector panels are provided to be interchangeable at a given reflector location in the lighting fixture 1, or within a group of the fixtures 1. For example, in a high bay facility it may be desirable to change locations of aisles, heights of shelves, locations of equipment, cubicles, assembly lines, etc. It may also be desirable to lease the facility to new tenants who have a different use for the area having the lighting fixtures 1. Therefore, the present inventor has determined that the lighting fixture 1 or groups of same may be adaptable for modifying a lighting being provided.

According to a preferred embodiment, it is desired to utilize linear type fluorescent lighting fixtures for providing uplighting as well as downlighting. In such a case, an individual lighting fixture 1 may be customized for providing a desired proportion of uplight versus downlight, by selecting a reflector type for individual cells 10 of the lighting fixture 1. For example, when it is desired that a particular cell 10 have nearly 100% of the usable light for the cell 10 be used as downlight, solid metal type reflector panel(s) 40 may be installed for that cell. The metal reflector panel 40 is preferably finished to have a mirror-like reflectance property. It is noted that a portion of the light emitted from the tube 12 may be absorbed by the reflector 40, so that a remaining portion of the light is considered as being usable. When it is desired that a proportion of the usable light for a cell 10 be emitted as uplight, reflector panel(s) 140 may be installed that have a known translucence, so that the proportion of uplight is thereby controlled. In this manner, by selectively installing individual reflector panels 40 or 140 at each of the cells 10, the uplighting proportion of the fixture 1 having multiple cells 10 can be customized. Further, the customizing can be applied to multiple fixtures 1, and to fixtures 1 that can be grouped according to various criteria such as, for example, relative placement with respect to a reflective surface such as a white wall, relative placement with respect to adjacent fixtures, various photometric or testing information, dimming applications, Visual Comfort Probability (VCP) parameters, dullness or brightness of reflector panels, interior design and aesthetics, etc.

The present inventors has determined that a mixture of different types of reflector may be used in a single fixture or in a group of individual fixtures. Providing such a mixture allows the manufacturer, user, or installer to customize the proportion of uplight versus downlight. For example, a reflector made of a solid aluminum material reflects nearly all of the incident light and does not allow any light from the fluorescent tube to 'seep' through and become uplight. A reflector may alternatively be formed of an acrylic material so that a percentage of the incident light seeps through the reflector and becomes uplight. By consistently forming such an acrylic reflector, the percentage of uplight for the reflector is known and is controlled when manufacturing the reflector. An illustrative example is now provided with reference to FIGS. 9A and 9B.

Figure 9A:
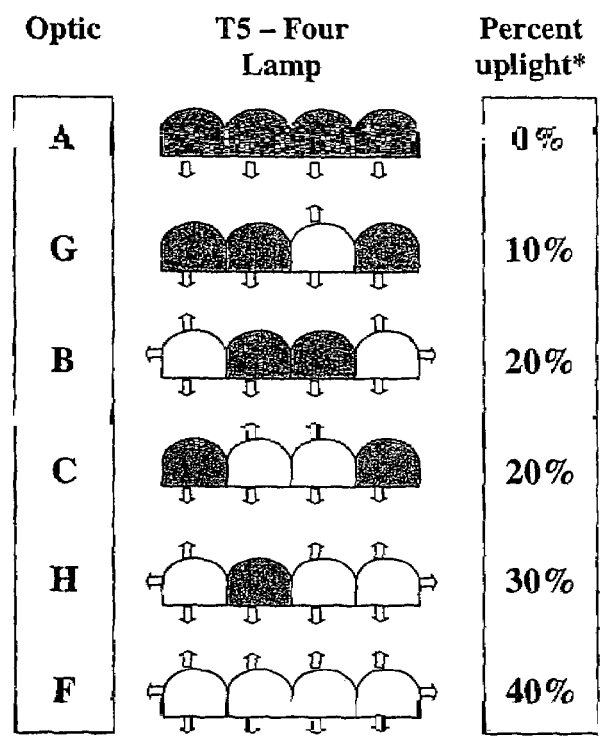
FIGS. 9A and 9B are reflector positioning charts used to configure lighting fixtures to provide a desired proportion of uplighting versus downlighting, according to an exemplary embodiment of the present invention.
Figure 9B:
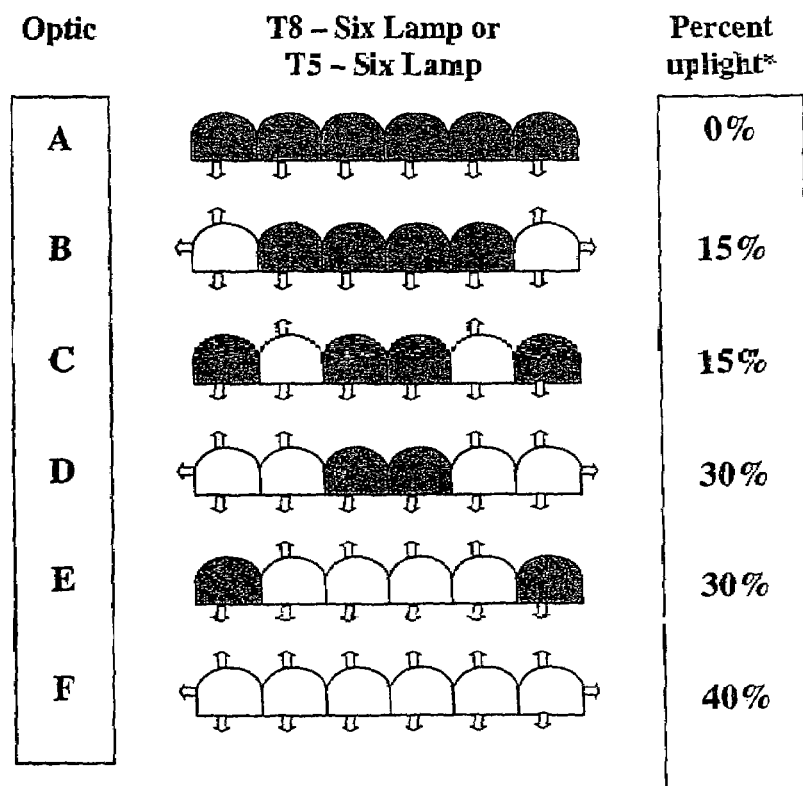

In FIG. 9A, a chart is shown for customizing the proportion of uplighting in a four tube T5 type lighting fixture. In FIG. 9B, a chart is shown for customizing the proportion of uplighting in a six tube T8 type lighting fixture. The symbols in the charts represent either a Type I reflector panel or a Type II reflector panel. In this example, the dark Type I symbols represent solid metal reflectors such as reflector panels 40 discussed above. The white symbols represent Type II reflectors such as acrylic reflector panels 140. The mixing of different types of reflectors according to their uplighting proportion may be simplified by use of the chart which specifies a number of Type I reflectors, a number of Type II reflectors, and locations where each type is to be placed. Such a chart may be provided, for example, as a template used by an assembly line worker or robot assembling the fixtures, as a label affixed to a surface of the lighting fixture, as a routine in a lighting design software program, and in various forms in a lighting fixture manufacturer's product catalog. The chart may present a relational database where a lighting designer inputs a desired proportion of uplight versus downlight for an area of a facility, inputs different desired proportions for different areas in a room, or inputs different desired proportions for different categories of space within a facility. Such a relational database may automatically compute an optimum placement of individual Type I or Type II reflectors, within individual fixtures or groups of fixtures, in order to achieve the desired uplight/downlight proportion(s). In the FIGS. 9A–B charts, it is seen that different uplighting proportions are obtained by selectively placing different type reflectors at particular cells 10 within a fixture 1, 100. Corresponding optic conditions are obtained for the particular reflector arrangement and are classified according to optic type. Such charts may be provided as labels affixed to a part of the lighting fixture 1, 100 not seen when the fixture 1, 100 is installed.

The present example is only illustrative, as any number of different types of materials and shapes of reflectors may be substituted for one another and a corresponding chart may utilize degrees of freedom appropriate for the respective variables. In other words, individual lighting fixtures may be customized in consideration of the component parts used to build the fixture, the lighting requirements for given areas, the number and proximity of other lighting fixtures, time delays and other implementations being used in conjunction with motion sensors, lighting switch patterns, etc. In a preferred embodiment, reflectors 40, 140 have the same general shape, where reflector 40 is formed of a highly polished aluminum and reflector 140 is formed of an acrylic so that reflector 140 has a light transfer function where a known amount of light passes through reflector 140 and becomes uplight, for a known incident light level and known dimensional relation of the light source to the reflector 140 surface(s). More particularly, the acrylic reflector panel 140 as shown in FIG. 8 has a flat inner surface formed with a same facet pattern as is shown for the reflector 40 of FIG. 7. This inner surface provides a first surface reflection of incident light in a manner essentially the same as the first surface reflection obtained from a metal reflector 40. For reflector 140, some of the incident light passes to the outer prism-shaped surface where it encounters a second surface reflection so that a Total Internal Reflection (TIR) of the incident light allows for directivity and efficiency of the resultant reflected light. The first surface reflection and the second surface reflection combine to create the downlight from the cell 10 in a highly efficient manner. A portion of the incident light passes (seeps) through the prismatic acrylic reflector 140, primarily at the 'corners' of the prisms where adjacent sides meet. Since it is difficult to form the prismatic surface with clean and sharp angles at these corners, a curved portion at the corner causes the incident light to pass through rather than be reflected. Such light becomes scattering and uplight for the cell 10. The light passing through the acrylic reflector panel 140 gets refracted so that a direction of the light rays is slightly altered. The angles between faces of the prism surface may be altered depending on factors such as the position of a light source creating angles of incidence, or for increasing a spread of light from reflector panel 140.

Referring again to FIGS. 9A and 9B, it can be seen that the Type I reflector panels 40 produce essentially only downlight, inner Type II reflector panels 140 produce uplight and downlight, and outer Type II reflector panels 140 produce uplight, downlight, and sidelight. The sidelight may be further directed by additional reflector panels (not shown) or may be utilized by removing portions of the endcap 30 or the inner endcap panel 35 shown in FIG. 1. The selective installation of either panel 40 or panel 140 in a cell therefore effects a controlling the proportion of uplight versus downlight. Although this process has been described for a single reflector panel per cell 10, the same process may be employed for a lighting fixture having multiple reflector panels in a single cell 10. In addition, the selection of reflector panels may be influenced by an implementation of a switching scheme for individual cells 10 of a fixture and/or for groups of cells 10 and/or groups of fixtures 1, 100. Although the present examples are described for a particular type reflector panel 140 made of a clear transparent or translucent acrylic, various other compositions and forms may be used for providing reflector panels having known seepage of light into uplight. For example, a reflector panel may be formed by vacuum metallizing.

Figure 10:
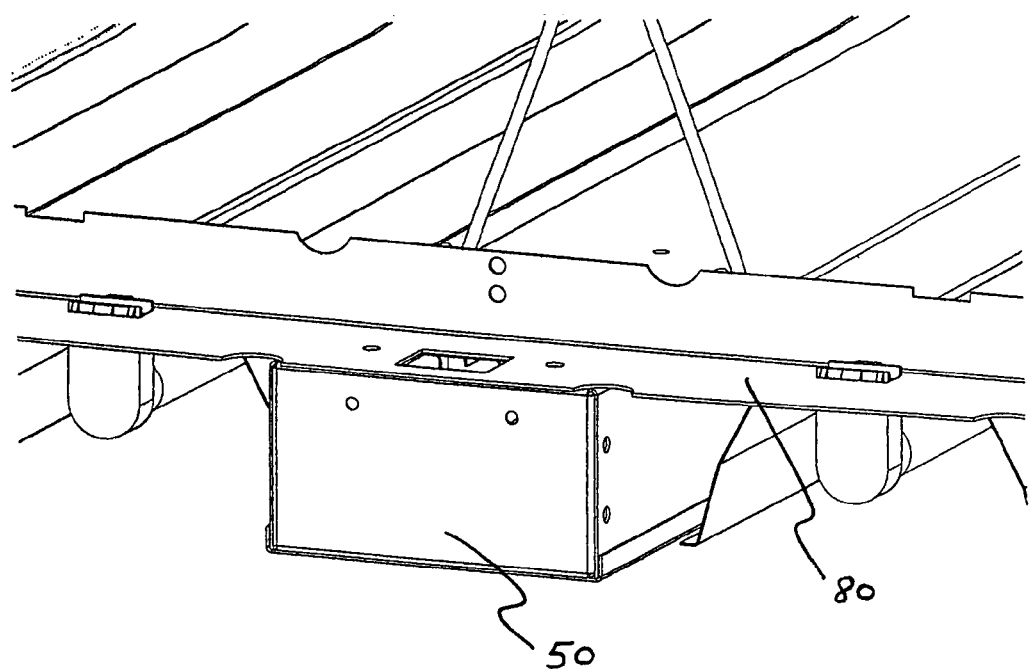
FIG. 10 is a view of a ballast connected to a socket mounting plate for a lighting fixture in a narrow light distribution configuration according to an exemplary embodiment of the present invention.
Figure 12:
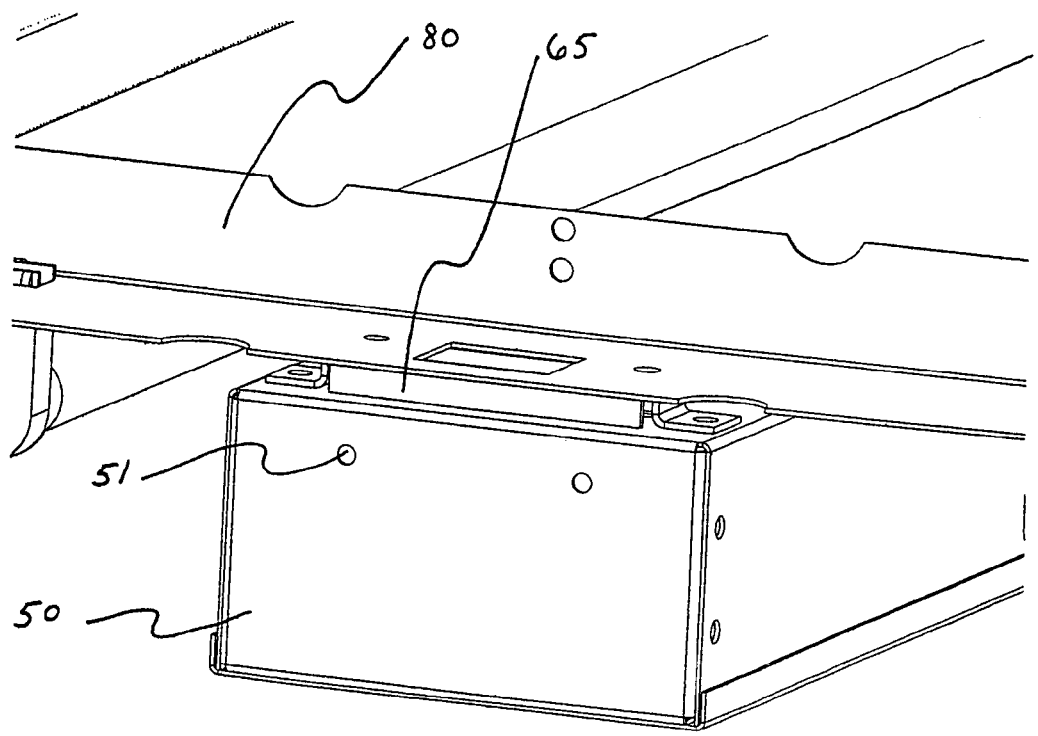
FIG. 12 is a view of a ballast connected to a socket mounting plate for a lighting fixture in a medium light distribution configuration according to an exemplary embodiment of the present invention.
Figure 11:
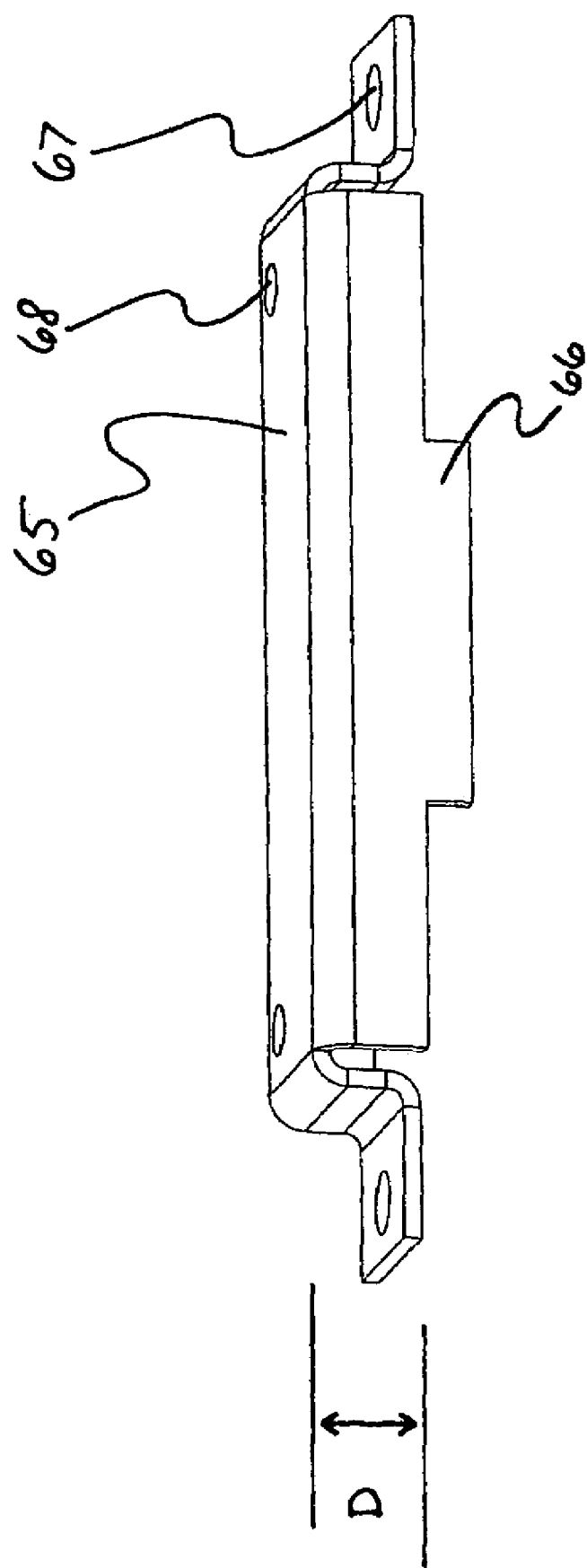
FIG. 11 is a view of a spacer used for configuring a lighting fixture in a medium light distribution mode according to an exemplary embodiment of the present invention.

Referring now to FIGS. 10–12, a preferred embodiment provides a spacer 65 for selectively adjusting a vertical height of the socket mounting plates 80 with respect to the ballast channel assembly 50. The spacer 65, for example, has a projecting portion or tab 66 that fits in a recess or slot formed in the upper surface of the ballast channel assembly 50. In addition, holes 67 are provided in the spacer 65 for attaching the spacer 65 to the ballast channel assembly 50 using screws, bolts, nuts, washers, or other fasteners. Further, holes 68 are provided in the top surface of the spacer 65 for attaching the spacer 65 to the socket mounting plate 80 as shown in FIG. 12. The illustration of FIG. 10 is provided to show the ballast channel assembly 50 being attached to the socket mounting plate 80 without using a spacer 65. Since the endcap 30 having reflector panels 40, 140 in a preferred embodiment is attached to the ballast channel assembly 50 using the two holes 51 provided in each end-facing wall of the ballast channel assembly 50, the use of a spacer 65 as shown in FIG. 12 positions the endcap 30 and reflector panels 40, 140 in a higher location with respect to the socket mounting plate 80 and corresponding tubes 12. Therefore, when a spacer 65 is used at each end of the ballast channel assembly 50, the plane coincident with the tubes 12 is at a higher location within the endcaps 30 and reflector panels 40, 140, so that the resultant downlight light distribution pattern from the fixture 1, 100 is narrowed. Similarly, when removing the spacers 65 from the ballast channel assembly 50, the endcap 30 and reflector panels 40 become disposed at a lower location with respect to the socket mounting plate 80 and corresponding tubes 12. Therefore, when a spacer 65 is removed from each end of the ballast channel assembly 50, the plane coincident with the tubes 12 is at a lower location within the endcaps 30 and reflector panels 40, so that the resultant downlight light distribution pattern from the fixture 1, 100 is widened into a medium distribution pattern. The distribution patterns of the downlight in this respect are simply narrowed or widened by the vertical relation of a tube 12 with respect to the bottom opening of each cell 10, which in turn is defined by the particular type of lamp 12, the width of the opening at the bottom of an installed reflector panel 40, 140, the translucence of the reflector panel 140, the position of the endcaps, etc. Spacing criteria along and across individual reflectors or groups of reflectors, a type of reflector, a distance between reflectors 40, 140 and endcaps 30, directivity, brightness, efficiency, reflector profile, and other criteria may be taken into consideration when determining whether a particular lighting location should have a cell 10 configured in a narrow, medium, or other light distribution pattern.

Other structures may alternatively be employed for vertically offsetting the plane of the tubes 12 from the reflector panels 40, 140. For example, in a typical installation, a position of the reflector panels 40, 140 is set by the position of the endcaps 30 since the reflectors 40, 140 may be installed, for example, by inserting the flanges 41, 141 of a reflector into slots 32, 33 of the endcaps 30. The positions of the endcaps 30 may be fixed, so that the vertical adjusting may only consist of changing a relative position of the socket mounting plates 80. In addition, another method and structure for changing the vertical location of the group of tubes 12 in a fixture 1, 100 may simply involve swapping socket mounting plates 80. In other words, different socket mounting plates 80 may be used that provide different vertical offsets for the sockets 11 in relation to the endcaps 30 and/or ballast channel assembly 50. By using various socket mounting plates 80, a manufacturer is able to offer fixtures having preset lighting distribution patterns. It is also possible to allow an end user to reconfigure her fixtures in such a manner at the particular facility.

Figure 13:
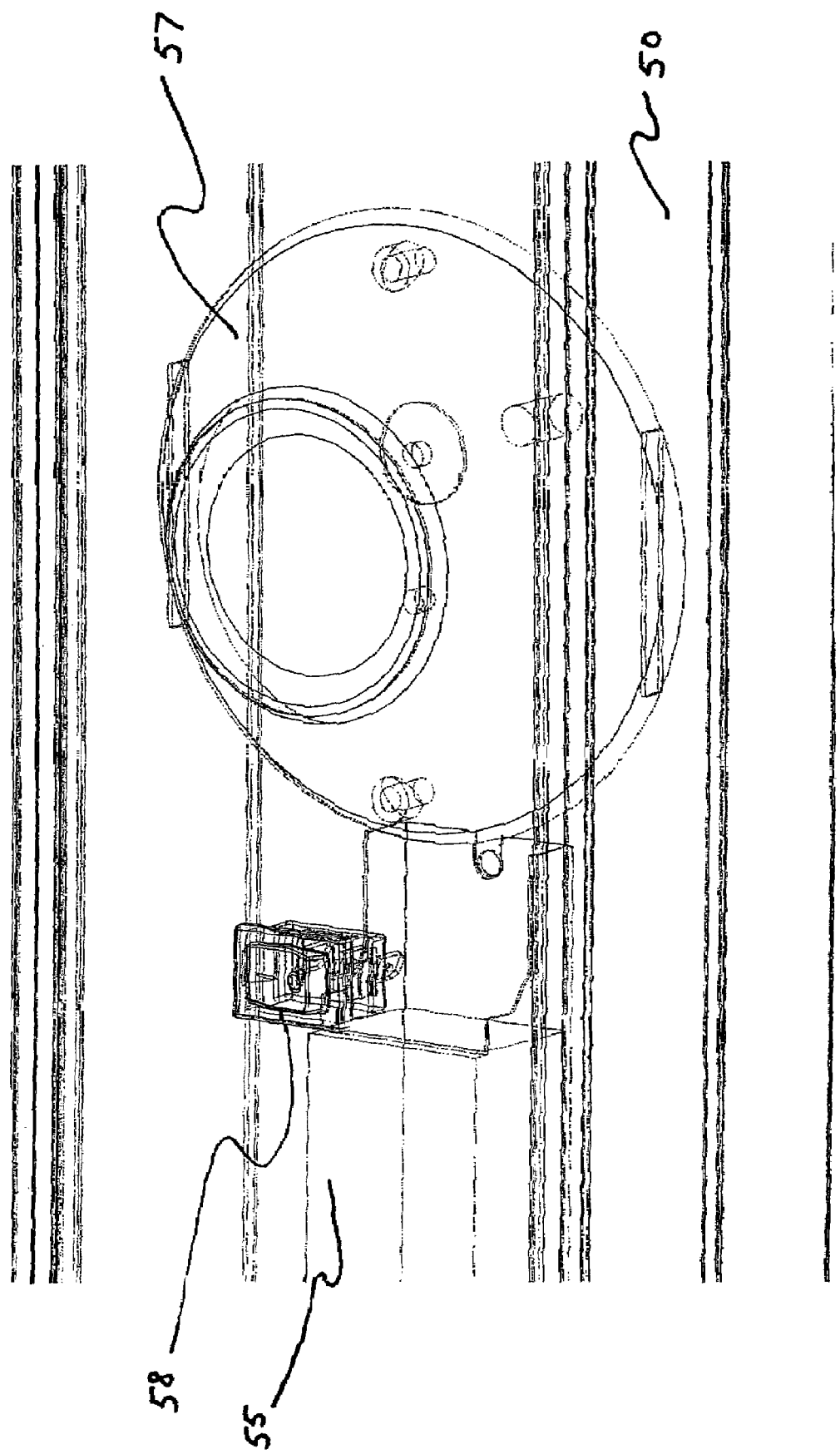
FIG. 13 is a view of a ballast channel assembly showing the respective locations of a ballast, a rocker switch, and an infrared detector assembly according to an exemplary embodiment of the present invention.
Figure 15:
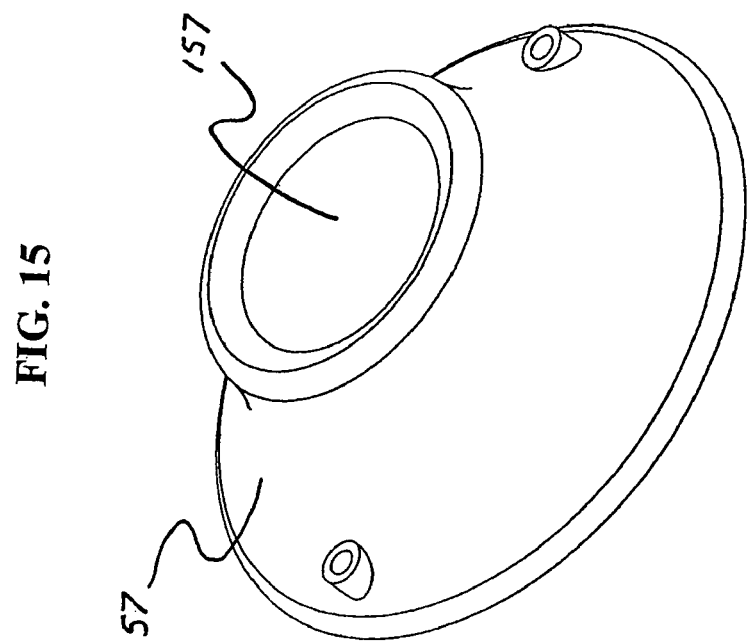
FIG. 15 is a view of an infrared detector assembly used in the configuration of FIG. 13.
Figure 14:
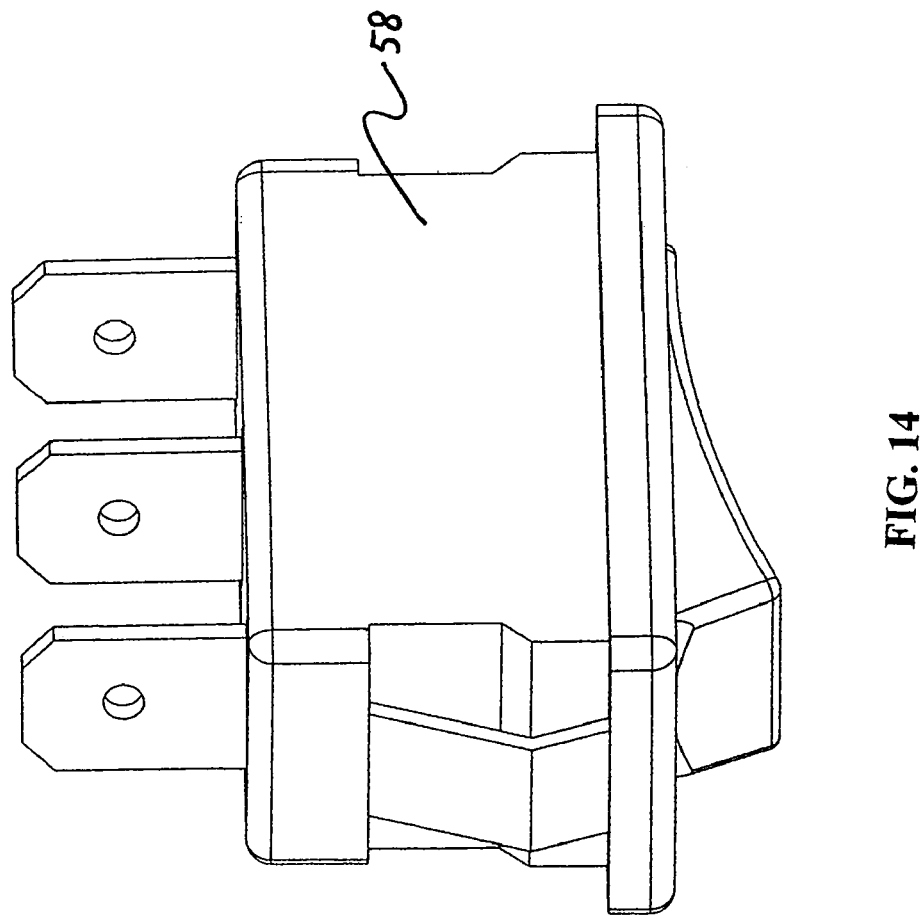
FIG. 14 is a view of a rocker switch used in the configuration of FIG. 13.

As shown in FIGS. 13–15, in a preferred embodiment, the lighting fixture 1 has a motion detector/switch 57 disposed in the ballast channel assembly 50 and positioned so that the motion detector/switch 57 views an area below the lighting fixture 1, 100 through a lens 157. A model CMRB-6 sensor available from SensorSwitch, Inc. is suitable. The detector/switch 57 may be provided with internal switching capabilities for turning on or off electrical power being provided to the ballasts 55. The detector/switch 57 turns on the power to the ballasts 55 when a person or other being enters the area of interest beneath the detector/switch 57. The detector/switch 57 uses Passive Infrared (PIR) in combination with a Fresnel Lens. As an occupant moves within the field-of-view, the sensor detects a change in motion and temperature. Every time an occupant moves, an internal time delay circuit may be reset. The detector/switch 57 may provide for an adjustable time delay, for example, from 30 seconds to 20 minutes. After a period of time the detector/switch 57 will automatically time out, turning the electrical power to the ballasts 55 off. The sensor's lens 157 typically views in separate 360° cone-shaped patterns, although this viewing window may be altered by, for example, blocking particular radial portions. The separate cones may be used for different applications according to a height of the fixture 1, 100 above the facility's floor. For example, a particular cone viewing at 54° angle may only effective up to a 12–15 foot mounting height, and is therefore not typically considered in high bay applications. Other cones may be used to view at particular angles so that the given cone may only be effective, for example, up to 20 feet while other cones may continually maintain their effectiveness up to 35 feet. In this manner, the detector/switch 57 may be adapted to particular applications. The detector/switch 57 in a preferred embodiment effectively connects or disconnects electrical power to a second switch 58 that controls the number of ballasts 55 to be switched by the action of detector/switch 57. For example, switch 58 may be a multiple position switch that allows a user to externally select whether a motion detection by detector/switch 57 switches all, some, or none of the ballasts 55. In other words, the detector/switch 57 connects or disconnects electrical power to the ballasts indirectly when the switch 58 is placed in series between the detector/switch 57 and the ballasts 55.

An exemplary embodiment of the switch 58 is shown in FIG. 14. As shown, the switch 58 is a known rocker type switch having a center-off type configuration. By way of example, when the switch 58 is used in a lighting fixture 100 having three ballasts 55 for three corresponding pairs of tubes 12, the rocker switch 58 may be placed in a first position to selectively allow the detector/switch 57 to connect/disconnect electrical power to a first one of the three ballasts 55 according to whether the detector/switch 57 has detected an occupant in its field of view. The rocker switch 58 may instead be placed in the third position, whereby the user selectively allows the detector/switch 57 to connect/disconnect electrical power to both the first one of the three ballasts 55 and a second one of the three ballasts 55. When the user places the rocker switch 58 in the center-off position, the switching action of the detector/switch 57 is not connected to the ballasts. In practice, this center-off position may be used for assuring that a third one of the three ballasts remains connected to electrical power to provide a minimum lighting to a given location while allowing the same fixture 100 to be changed for a step dimming type action by the detector/switch 57. The ability to configure the step dimming of a lighting fixture 1, 100 externally of the fixture is highly advantageous for the user, who thereby avoids opening the fixture for such a reconfiguring. The switch 58 may be chosen in various forms and/or configurations for particular lighting applications. For example, the switch 58 may be remote to the fixture 1, 100, may be a DIP type, a rotary type, a paddle type, an other type, may be connected and/or controlled by a timer or ambient lighting sensor, may be temperature controlled, may be controlled by wireless device, may be programmed, etc. In addition, a master/slave relationship may be configured for one or more groups of lighting fixtures 1, 100 so that, for example, one or more of the switches 58 in a particular group may be used to configure a step dimming for the group. Similarly, for example, one or more of the detector/switches 57 may be used in a master/slave configuration for causing electrical power to be connected to various ones of the ballasts 55 for a given group of lighting fixtures 1, 100. A lighting system may include a controller (not shown) for remotely controlling one or more of the switches 58. For example, a digitally addressable lighting interface (DALI) protocol may be adapted for implementing such a control.

The placement of the ballast channel assembly 50 in a same lateral plane with the cells 10 that contain the reflector panels 40, 140 and the tubes 12, allows the lighting fixture 1, 100 to have a low profile, for example approximately less than 5 inches high. An optional hook accessory (not shown) may be provided for use in an alternate method of hanging the fixture 1, 100. The lighting fixture 1, 100 may be configured for hard wiring or provided with an optional cord accessory. The fixture may be formed for adding lens and/or wire-guard accessories.

Other features that may be utilized with the lighting fixtures 1, 100 include use of a programmed rapid-start ballast system in order to optimize lamp life, increased structural integrity for assuring an upgraded 90° C. case temperature rating, use of a ballast assembly for obtaining 0° F. cold starting capability, end of lamp life protection that removes lamp power when a lamp is approaching a predetermined condition, design changes that allow for use of different nominal operating temperatures such as by use of different lens systems, various types of lamp sockets, multiple level control of lighting parameters and illumination, different numbers of lamps per fixture, instant-start, high output ballast factors, and others.

While the principles of the invention have been shown and described in connection with specific embodiments, it is to be understood that such embodiments are by way of example and are not limiting.

What is claimed is:

1. A linear fluorescent lighting fixture comprising:
   a plurality of fluorescent tube locations;
   a plurality of pairs of tube sockets, one pair of sockets being disposed at each of the plurality of fluorescent tube locations, and each pair of sockets defining a fluorescent tube axis therebetween;
   a pair of socket mounting plates for holding the plurality of tube sockets;
   a plurality of laterally-flexible reflector panels, one of the reflector panels being disposed at each of the plurality of fluorescent tube locations; and
   a pair of endcaps each having a plurality of horizontal slot pairs, each slot pair receiving edges of a corresponding one the reflector panels, and each slot of the slot pair being substantially parallel to the fluorescent tube axis at the fluorescent tube location of the corresponding reflector panel wherein at least one of the reflector panels is removable and insertable with respect to ones of the horizontal slots by laterally flexing the reflector panel.

2. The fixture of claim 1 wherein gaps are formed between bottommost edges of adjacent ones of the reflector panels.

3. The fixture of claim 1 wherein each of the reflector panels has a faceted profile.

4. The fixture of claim 1 wherein at least one of the reflector panels is formed of one of a translucent and a transparent material, has a faceted smooth inner reflector surface, and has a prismatic outer reflector surface.

5. A lighting system, comprising:
   a plurality of fluorescent lamp positions disposed in a first horizontal plane;
   at least one reflector panel of a first type;
   at least one reflector panel of a second type; and
   a plurality of reflector panel positions, each reflector panel position securing one reflector panel such that at least portions of the reflector panel are at a vertical position above the horizontal plane, the one reflector panel being one of the first type and the second type reflector panel;
   wherein the first type reflector panel has a greater translucency compared to the second type reflector panel, and wherein each of the reflector panels is structured for being secured in any one of the reflector panel positions.

6. The lighting system of claim 5, wherein the first type reflector panel is formed of an acrylic.

7. The lighting system of claim 5, wherein the first type reflector panel is prismatic.

8. The lighting system of claim 5, wherein the second type reflector panel is formed by vacuum metallizing.

9. The lighting system of claim 5, wherein the first type reflector panel has a multi-faceted partial polygon profile.

10. The lighting system of claim 5, further comprising a chart indicating specific placement information for the plurality of reflector panel positions, the information including an amount of uplight, as a percentage of total light emitted by the lighting system, corresponding to placement of either a first type or a second type reflector panel in each one of the plurality of reflector panel positions.

11. The lighting system of claim 5, wherein the plurality of reflector panel positions are aligned along a second horizontal plane, the lighting system further comprising:
   a ballast channel assembly disposed in parallel with the plurality of reflector panels, having a top surface, and having a longitudinal axis;
   a first spacer and a second spacer respectively disposed on opposite lengthwise ends of the top surface of the ballast channel assembly, each of the spacers having a topmost surface;
   a first lamp socket mounting member and a second lamp socket mounting member opposing one another and correspondingly mounted to the topmost surfaces of the first and second spacers, each lamp socket mounting member having a longitudinal axis that is essentially orthogonal to the longitudinal axis of the ballast channel assembly when so mounted,
   wherein the spacers define the vertical position as a distance between the first and second horizontal planes.

12. The lighting system of claim 11, further comprising a chart indicating values for the vertical position of the reflector assembly based on a light distribution pattern desired for the lighting system, the light distribution pattern being specified according to the width of a distribution of light from the lighting system.

* * * * *

UNITED STATES PATENT AND TRADEMARK OFFICE
CERTIFICATE OF CORRECTION

PATENT NO. : 7,207,690 B2  Page 1 of 1
APPLICATION NO. : 11/236906
DATED : April 24, 2007
INVENTOR(S) : Haugaard et al.

It is certified that error appears in the above-identified patent and that said Letters Patent is hereby corrected as shown below:

In column 5, line 64, delete "XX" and insert --11--.

In column 7, line 53, delete "inventor has" and insert --inventors have--.

In column 8, line 18 delete "has" and insert --have--.

In column 11, line 28 after "may only" and insert --be--.

In column 12, line 64, after "panels" delete ",".

In column 12, line 67, after "panel" insert --,--.

In column 13, line 22, delete ";" and insert --,--.

In column 14, line 17, after ";" insert --and--.

Signed and Sealed this

Fifteenth Day of April, 2008

JON W. DUDAS
*Director of the United States Patent and Trademark Office*